US00RE41743E

(19) United States
(12) Reissued Patent
Naudin et al.

(10) Patent Number: US RE41,743 E
(45) Date of Reissued Patent: Sep. 21, 2010

(54) OPTICAL FIBER CABLE INLET DEVICE

(75) Inventors: Thierry Naudin, Orvault (FR); Christophe Corbille, Saint Nicolas de Redon (FR); Hervé Brunet, Saint Nazaire (FR); Jacques Salaün, Clamart (FR)

(73) Assignee: 3M Innovative Properties Company, St. Paul, MN (US)

(21) Appl. No.: 10/996,326

(22) Filed: Nov. 23, 2004

Related U.S. Patent Documents

Reissue of:
(64) Patent No.: 6,487,344
Issued: Nov. 26, 2002
Appl. No.: 09/365,622
Filed: Aug. 2, 1999

(30) Foreign Application Priority Data

Aug. 4, 1998 (FR) ..... 98 10172

(51) Int. Cl.
*G02B 6/44* (2006.01)

(52) U.S. Cl. ..... 385/100; 385/113; 385/138
(58) Field of Classification Search ..... 385/100–114, 385/138; 254/391, 392
See application file for complete search history.

(56) References Cited

U.S. PATENT DOCUMENTS 4,958,903 A * 9/1990 Cobb et al. ..... 385/135
5,042,901 A 8/1991 Merriken et al.
5,598,500 A * 1/1997 Crespel et al. ..... 385/139
5,689,607 A 11/1997 Vincent et al.
5,745,633 A 4/1998 Giebel et al.
5,778,122 A 7/1998 Giebel et al.
5,825,961 A 10/1998 Wilkins et al.
5,870,515 A 2/1999 Ott et al.
RE36,592 E 2/2000 Giebel et al.
6,028,974 A 2/2000 Shyu et al.
RE37,028 E 1/2001 Cooke et al.
6,269,214 B1 * 7/2001 Naudin et al. ..... 385/135

FOREIGN PATENT DOCUMENTS

EP 0 589 618 A1 3/1994
JP 61-267007 11/1986
WO 94/24598 10/1994
WO 95/06891 3/1995

* cited by examiner

*Primary Examiner*—Hwa (Andrew) Lee
(74) *Attorney, Agent, or Firm*—Gregg H. Rosenblatt

(57) ABSTRACT

A watertight inlet device for inserting a cable containing optical fibers into a chamber or a container, e.g. into a splice box. The device includes a metal solepiece for securing the strength members of the optical cable, and which plugs into and fixes to a tubular sealing body equipped with an external O-ring gasket and having its rear portion shaped to form a sealing stuffing box on the outer sheath of the cable. The rear of the nut of the stuffing box receives a clamp for retaining the cable. Once the device has been fitted, the resulting assembly is inserted into the inlet passageway until it abuts against a shoulder in the passageway. Then only the head of the securing solepiece and a groove in the body project inside the container, the groove then receiving a key or fork for retaining the assembly.

39 Claims, 8 Drawing Sheets

OPTICAL FIBER CABLE INLET DEVICE

Matter enclosed in heavy brackets [ ] appears in the original patent but forms no part of this reissue specification; matter printed in italics indicates the additions made by reissue.

FIELD OF THE INVENTION

The present invention relates to a cable inlet device for inserting an optical fiber cable into a chamber or into a container, e.g. into a splice box containing an optical organizer and designed to be placed outdoors or in a buried duct.

In accompanying FIG. 1, which is described in more detail further on below, reference 1 designates an optical cable of known type.

That cable 1 is provided with a strong semi-rigid outer sheath 2 which protects a set of small flexible tubes 3, each of which contains a few optical fibers 4 themselves often embedded in a protective and sealing grease.

In addition, two semi-rigid strength members 5 and 6, e.g. made of aramid fibers, are provided inside the sheath 2, and they are referred to as "peripheral strength members" because they are positioned close to the sheath 2 on either side of the middle longitudinal axis of the optical cable 1.

The free end of the cable 1 is stripped, i.e. the sheath 2, the small protective tubes, and the sealing grease are removed.

The strong outer sheath 2, the strength members 5, 6, the small tubes 3, and the grease coating the fibers 4 are mechanical protections for the optical fibers 4 and they are made necessary because optical fibers cannot withstand any mechanical stress.

Instead of using side semi-rigid strength members 6, 5 to impart strength to the optical cable 1, it is also possible, as shown diagrammatically by way of example in FIG. 1 and in FIG. 10, to use an axial and central semi-rigid strength member 7, and flexible side strength members (not shown), all this being well known to the person skilled in the art.

BACKGROUND OF THE INVENTION

In the art, the axial and central semi-rigid strength member 7 may be referred to as a "central strength member", and the cable as stripped as shown in FIG. 1 may be said to be "prepared".

In view of the mechanical weakness of optical fibers, it is necessary for a watertight inlet via which an optical cable can enter a chamber or a container to be provided not only with sealing means, but also with strong means for securing the outer sheath 2 of the cable and its strength members, such as the peripheral strength members 5, 6, or the central strength member 7 and its associated flexible peripheral strength members.

Currently, the Applicant sells an elongate metal securing solepiece that is in the form of a rigid metal bar whose downstream end is provided with a clamping piece for securing the optional central strength member, and whose upstream end is provided with a pair of notches for receiving a clamping collar for clamping the outer sheath of the optical cable against said bar, the upstream notches being followed downstream by two pairs of notches for receiving two securing collars for securing the peripheral strength members.

Once the optical cable has been prepared, then put in place and clamped onto the securing solepiece, the resulting assembly is threaded into the container, and the securing solepiece is fixed by means of screws to a place provided for that purpose in the container. Then, the cable inlet is sealed either by using a heat-shrinkable sleeve, or by pouring in a sealing resin, or else (in other known and analogous devices) by using a conventional stuffing-box sealing device.

Such known cable inlet devices suffer from the drawbacks of being quite voluminous in the longitudinal direction, and of being awkward to use because it is necessary to act positively in the container to fix the securing solepiece therein by means of screws, while access to the inside of the container is often difficult. In addition, the cable inlet sealing is positioned before the place where the outer sheath is secured, so that any external stresses on the cable are applied initially to the sealing device (heat-shrinkable sleeve, sealing resin, stuffing box, etc.), and only then to the sheath securing device. As a result, such a cable inlet device is not very reliable because the sealing device is not always designed to be capable of withstanding external stresses for very long.

OBJECTS AND SUMMARY OF THE INVENTION

An object of the invention is to remedy those drawbacks.

To this end, the invention provides a watertight inlet device for inserting a cable containing optical fibers into a chamber or into a container via an inlet passageway provided for this purpose;

said device being fitted to the cable and secured to the strength members thereof before the cable is inserted into the chamber or container, the outer sheath of the cable further being secured directly on the watertight inlet device and upstream from its sealing means, the watertight inlet device then being received by being threaded into the chamber or container, and being locked therein merely by keying.

The invention provides, in particular, a device as defined above, said device comprising:

at the front: a rigid securing solepiece provided with orifices or slots into which central strength members and/or side strength members of the cable are inserted, each of these orifices or slots co-operating with a clamping member typically acting by a screw being rotated to clamp the strength member(s) that it receives;

at the rear: a nut for clamping a stuffing box, which nut is also shaped to receive a retaining member for retaining the outer sheath of the optical cable; and between the front and the rear: a sealing tubular body whose front portion engages telescopically into said securing solepiece, means being provided for fixing the sealing body to the securing solepiece in the engaged position, the rear portion of the tubular body co-operating with a sealing ring to form the sealing stuffing box that is complementary to said clamping nut, the stuffing box achieving the sealing by clamping on the outer sheath of the cable;

the sealing body also receiving means for providing the sealing relative to the inlet passageway in the chamber or container, and further including an abutment member which is designed to cooperate with a complementary shape of said inlet passageway to limit the insertion of the device through said inlet passageway, the abutment position then being such that the head of the device emerges inside the chamber or container, keying means then being provided for locking the device in this position.

Advantageously, said clamping nut has an outside shape comprising a plurality of facets, while the rear portion of said passageway orifice is of the corresponding female shape.

Also advantageously, said keying means are constituted by a semi-rigid retaining fork which plugs into an outer annular groove in the cable inlet device, thereby holding it captive in part, the groove therefore emerging downstream relative to said inlet passageway when the device is inserted to its abutment position. /

BRIEF DESCRIPTION OF THE DRAWINGS

The invention can be well understood, and its various advantages and characteristics appear more clearly from the following description of a non-limiting embodiment given with reference to the accompanying diagrammatic drawings, in which.

MORE DETAILED DESCRIPTION

Figure 1:
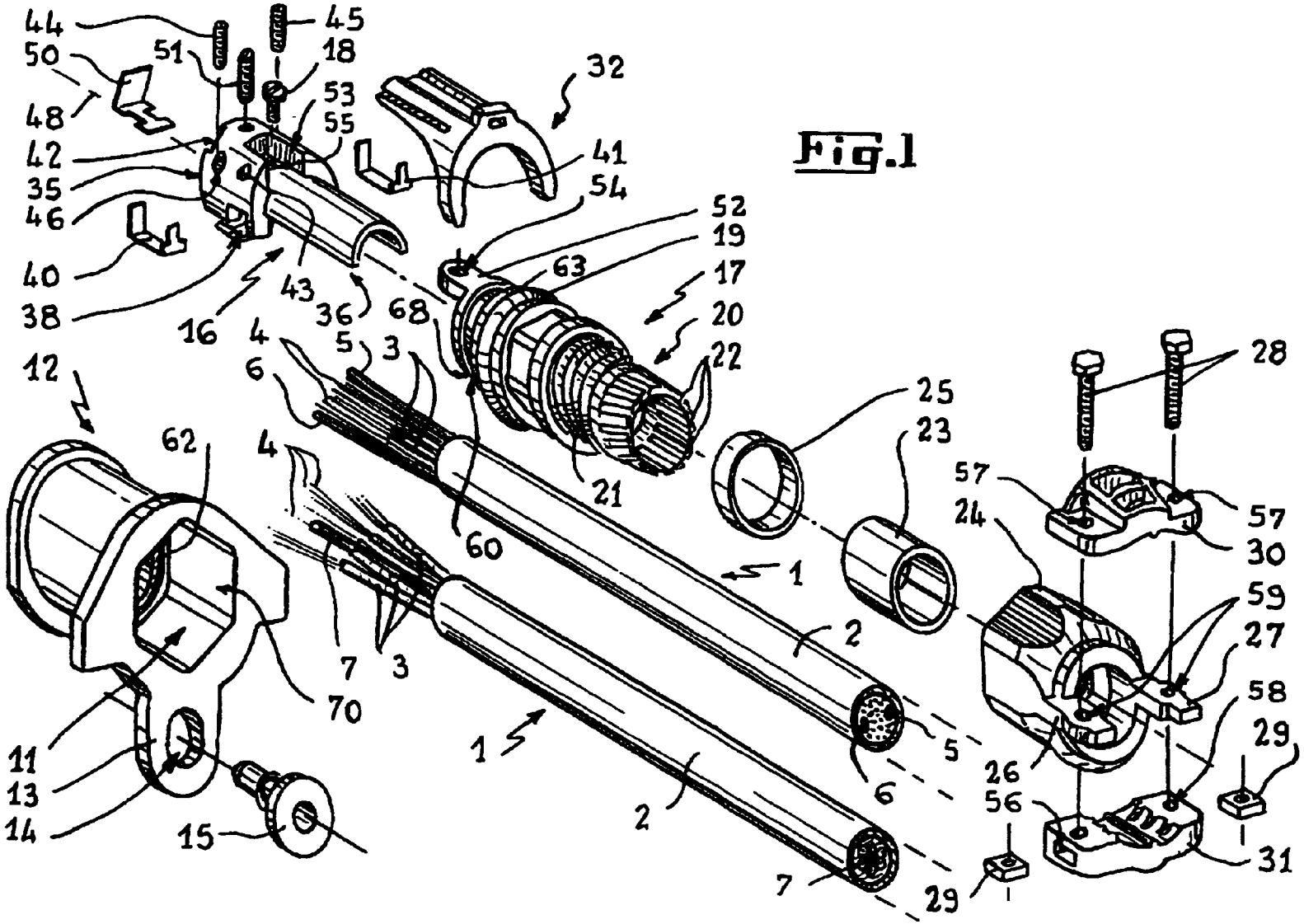
FIG. 1 is an exploded perspective view of a cable inlet device.
Figure 9:
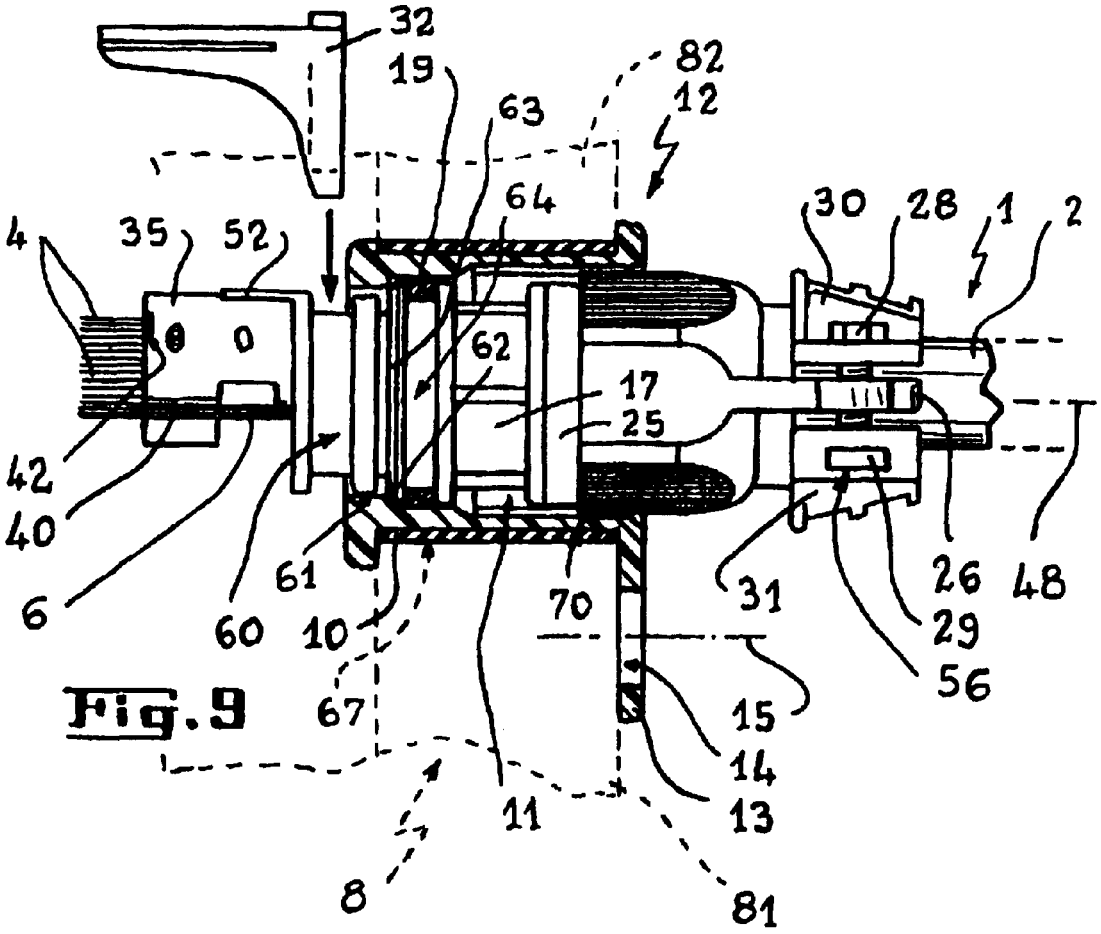
Figure 9A:
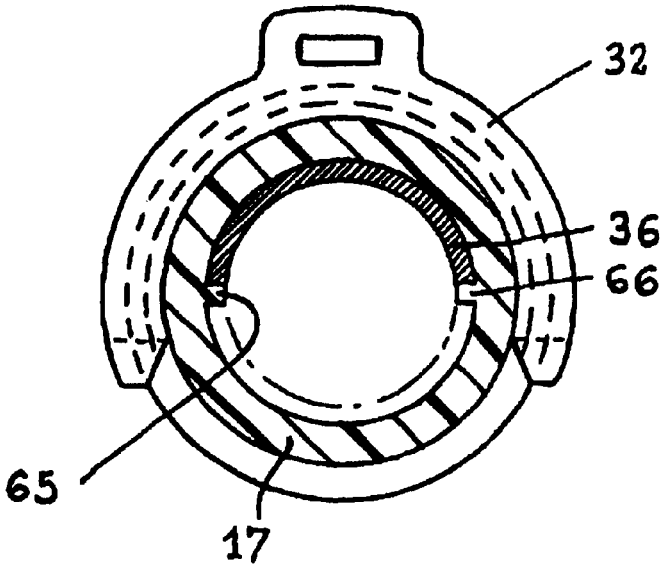
Figure 10:
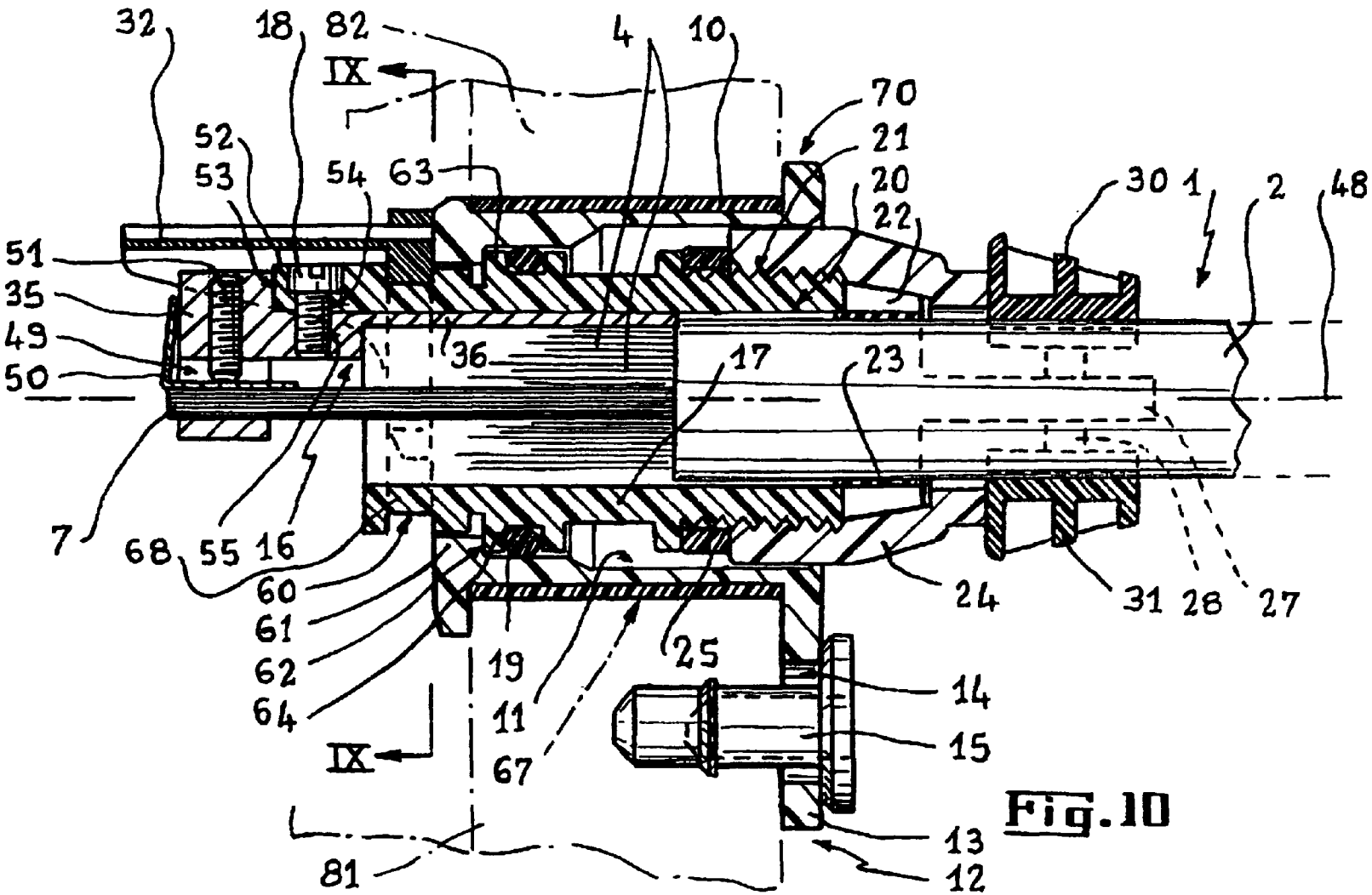
FIG. 10 is a longitudinal axial vertical section view of the cable inlet device as fitted and put in place.

Reference is made firstly to FIGS. 1, 9A, and 10 which show the make-up of this optical cable inlet device.

In this example, the optical cable inlet device is assumed to constitute an inlet for inserting an optical cable into a splice box 8 made up of a recessed bottom 81 and of a lid 82, the bottom and the lid closing on each other with a peripheral sealing gasket 10 being interposed in conventional manner.

As explained below, since the inlet passageway 11 must have a special shape, while the box is a standard box, an adapter piece 12 is provided in this example. The adapter piece is placed in the standard inlet orifice 67 of the box 8 with a gasket 10 being interposed, the gasket being locally annular where it is interposed. The piece 12 is advantageously provided with a side lug 13 provided with an orifice 14 through which a screw 15 or a holding stud or any other device, can pass, thereby enabling the piece to be fixed in position on the box 8.

A metal securing solepiece 16 is situated at the front of the device, i.e. at the end that is further downstream relative to the direction in which the optical cable 1 is inserted into the splice box 8.

The securing solepiece 16 is plugged telescopically, as shown in the drawings, and as explained in more detail below, into a tubular sealing body 17 made of a plastics material, these two elements 16 and 17 then being fixed together by means of a locking screw 18, The sealing body 17 receives an outer O-ring sealing gasket 19 and, if its front portion 68 is shaped to receive the securing solepiece 16, its rear portion 20 is shaped to form a stuffing box, with a thread 21 and abutment fingers 22 which co-operate in conventional manner with an annular sealing gasket 23 in a matched relationship with the diameter of the cable 1, and a very special clamping nut 24 of hexagonal outer section for clamping the outer sheath 2 of the cable 1.

Since optical cables may be of various diameters, a rigid compensation ring 25 is provided, also in a matched relationship with the diameter of the cable 1 used, which compensation ring fits over the thread 21 and limits the clamping of the nut 24 to its correct value, the nut coming into abutment against the ring 25 at the end of the clamping stroke.

The rear portion of the nut 24 is also provided with two longitudinal and side tabs 26, 27 which, via respective ones of two screws 28 and their associated nuts 29, receive the two halves 30, 31 of a clamp for mechanically retaining the cable 1 by the clamp clamping on the outer sheath 2 of the cable.

Finally, a key is provided in the form of a semi-rigid fork 32 that is designed to lock the device once it is fitted to the cable 1 and finally installed in the box 8.

All these elements of the cable inlet device are described briefly above. The following description of the successive stages in which the device is fitted and then put in place will enable the missing details to be given.

Figure 2:
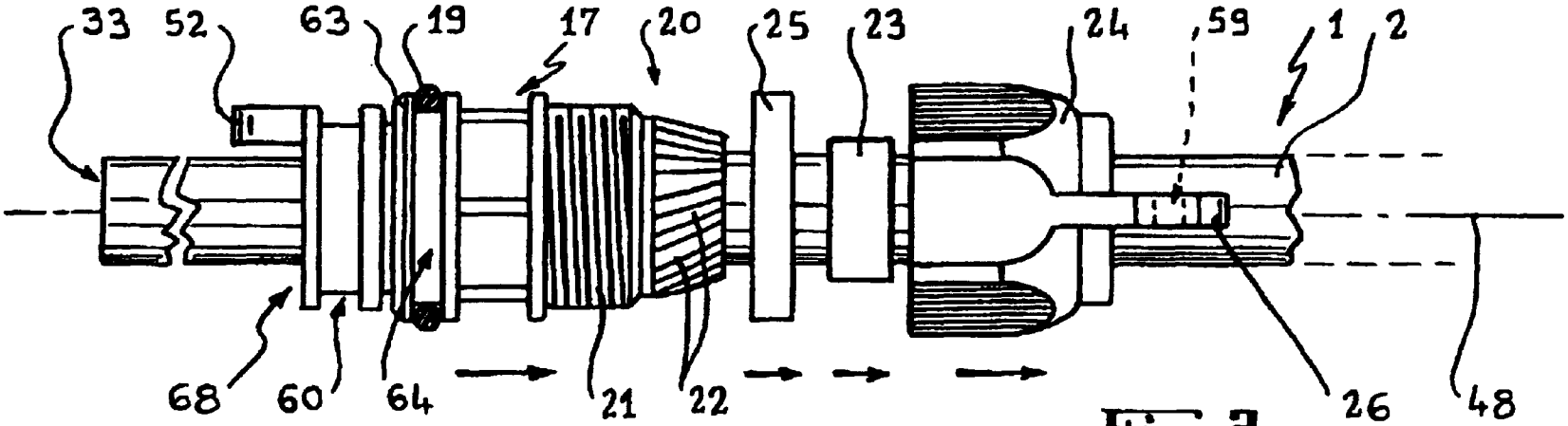
FIGS. 2 to 9, together with their complementary FIGS. 4A, 4B, 4C, and 9A, which is a section view on IX—IX of FIG. 10, diagrammatically show the successive stages in which the cable inlet device is fitted and then put in place.

With reference to FIG. 2, once the free end 33 of the cable 1 has been cut to the right length but before it has been stripped, the following are successively threaded onto the cable: the very special stuffing-box nut 24, the annular gasket 23, and, if necessary, the compensation ring 25, then the tubular sealing body 17 pre-fitted with the O-ring gasket 19.

The part 17 is made of a plastics material which, while being very rigid, nevertheless remains sufficiently flexible to enable the stuffing box fingers 22 to clamp the annular gasket 23 on tightening the stuffing-box nut 24 (whose inside section is conventionally frustoconical as shown in FIG. 10) onto the nut-receiving thread 21. The plastics material used for said part may, for example, be a non-filled polyamide.

Figure 3:
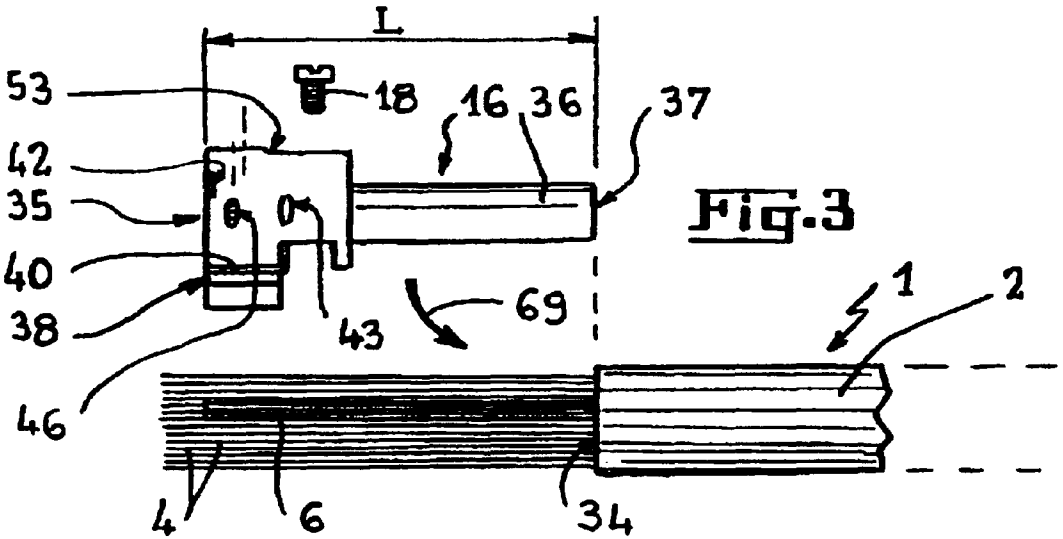

Then, as shown in FIG. 3, the "preparation" of the cable 1 can commence. For the purpose of preparing it, the cable is stripped of its outer sheath 2 and of its small protective tubes 3, starting from the chosen place 34 to release the length of optical fibers 4 desired inside the box 8, and the grease is then removed from the stripped optical fibers 4. The strength members 5, 6 are also cut off so that they extend beyond the transverse stripping plane 34 only by a length substantially equal to the length L of the securing solepiece 16.

The metal solepiece 16 is made in one piece (see also FIG. 1) comprising a head 35 which is designed, as explained below, to secure the peripheral strength members, e.g. the strength members 5 and 6, and the central strength member 7 (FIG. 10) if such a central strength member exists, and a tail 36 in the form of a half cylinder of semi-circular section. As described below, the tail 36 plugs snugly into the tubular orifice formed in the front half 68 of the sealing body 17.

Figure 4:
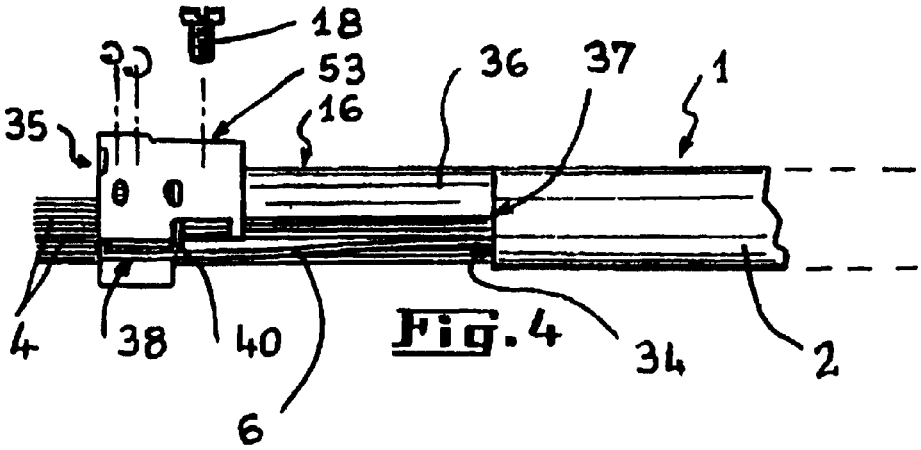
Figure 4A:
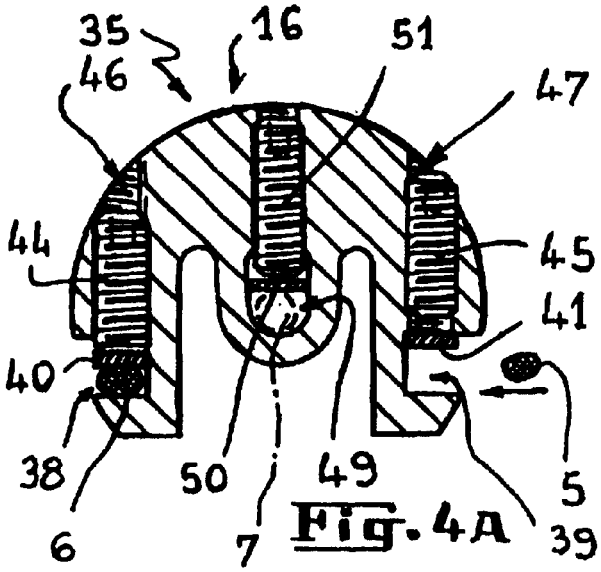
Figure 4B:
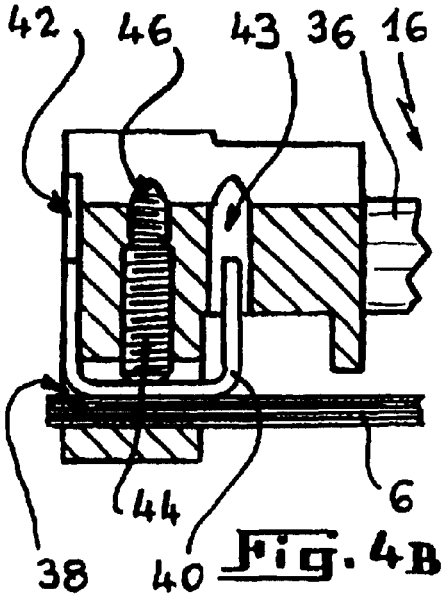

As indicated by arrow 69 in FIG. 3, and as shown in FIG. 4, the securing solepiece 16 is then positioned contiguous with the non-stripped end of the cable 1, i.e. so that the transverse stripping plane 34 and the transverse plane 37 of the rear end of the tail 36 substantially coincide to form a single common transverse plane that is vertical as shown in the drawing.

Figure 4C:
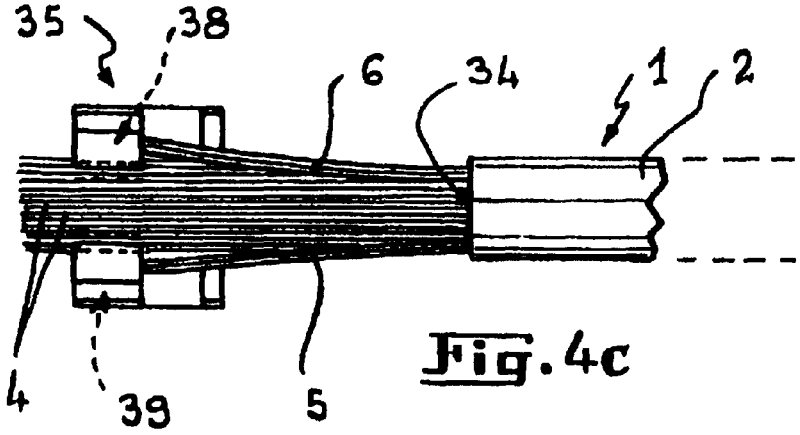

As shown in FIGS. 4 to 4C, the two peripheral strength members 5 and 6 of the cable are then secured in the head 35 of the securing solepiece 16.

To make such securing possible, the head 35 is provided with two side notches 38 and 39, in which the peripheral strength members 6 and 5 are inserted sideways (see, in particular, FIGS. 1, 4A to 4C).

A respective U-shaped metal clamping piece 40, 41 is mounted in each of the notches 38, 39 to slide downwards along a vertical guide recess 42 and along a vertical guide orifice 43. By tightening the two vertical screws 44 and 45 in their respective tapped vertical orifices 46 and 47, the clamping pieces 40 and 41 are caused to descend and to press strongly against but without damaging respective ones of the two peripheral strength members 6 and 5 that have been inserted into respective ones of the notches 38 and 39.

It should be noted that the head 35 is also shaped to secure the optional central strength member 7 (FIG. 10). For this purpose, the head 35 is provided with an axial orifice 49 extending along the middle longitudinal axis 48 of the device and of section that is oblong in the vertical direction, which orifice receives and holds another securing metal clamping piece 50 (FIGS. 1 and 10). The central strength member 7 is secured, as above, by clamping the central strength member between the clamping piece 50 and the wall of the oblong hole 49 into which the central strength member 7 has been inserted, the clamping also being actuated by means of a vertical clamping screw 51.

The presence of the clamping pieces 40, 41, 50 is not essential, and it is possible, as is the case for copper wires, merely to lock the strength members 5, 6, and 7 by means of corresponding screws 44, 45, and 51. However, such clamping pieces are very useful in this example because they make it possible to secure the strength members 5, 6, 7 strongly without damaging them, which would be detrimental to the reliability of the securing.

Figure 5:
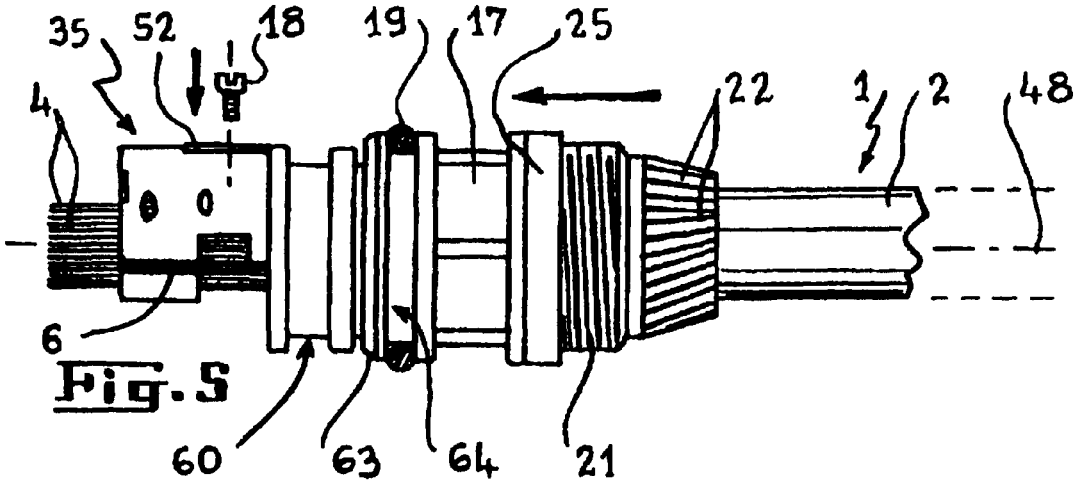

Once the strength members 6, 5 have been secured in this way, the tubular sealing body 17 is grasped, and, as shown in FIG. 5, it is plugged fully onto the tail 36 of the securing solepiece 16.

In order to optimize and to guide this operation, the front periphery of the sealing body 17 is provided (FIG. 1) with a longitudinal projection 52 which plugs into a longitudinal and corresponding female notch 53 in the head 35 of the metal securing solepiece 16. In addition, two side ribs 65, 66 (FIG. 9A) on the cylindrical inside wall of the body 17 participate in guiding the body 17 as it slides over the tail 36 of the metal solepiece 16.

The solepiece 16 is then fixed to the body 17 by means of the screw 18 which passes through a vertical orifice 54 in the projection 52 and screws into vertical tapping 55 in the head 35 (FIGS. 1 and 10), the tapping 55 and the orifice 54 then being in alignment.

Figure 6:
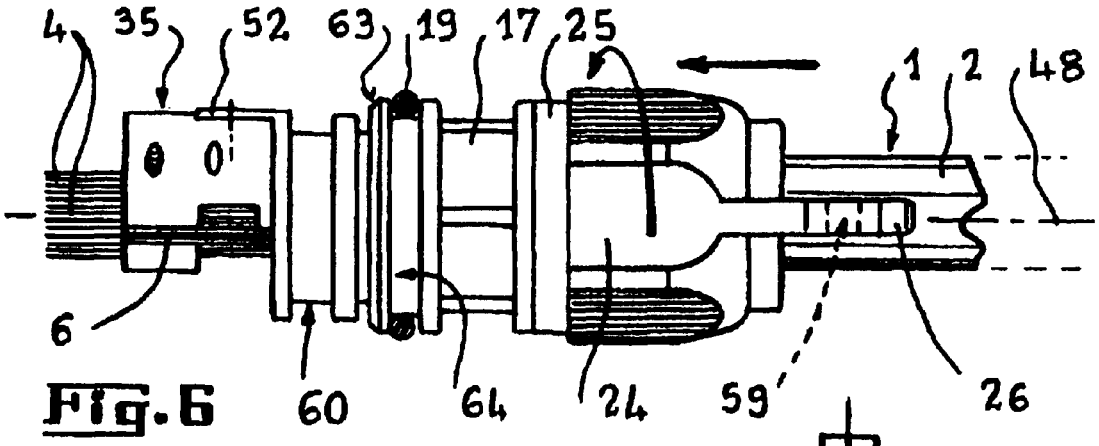

After making sure that the annular sealing gasket 23 and the compensation washer 25 are properly in place, the next step is to tighten the special nut 24 of the stuffing box, as shown in FIG. 6. As mentioned above, sealing is obtained between the nut and the outer sheath 2 of the cable 1 once the nut 24 has been tightened until it comes into abutment against the compensation washer 25.

It should be noted that the hexagonal outside shape of the nut, i.e. it having six facets, enables it to be tightened by means of a wrench.

Figure 7:
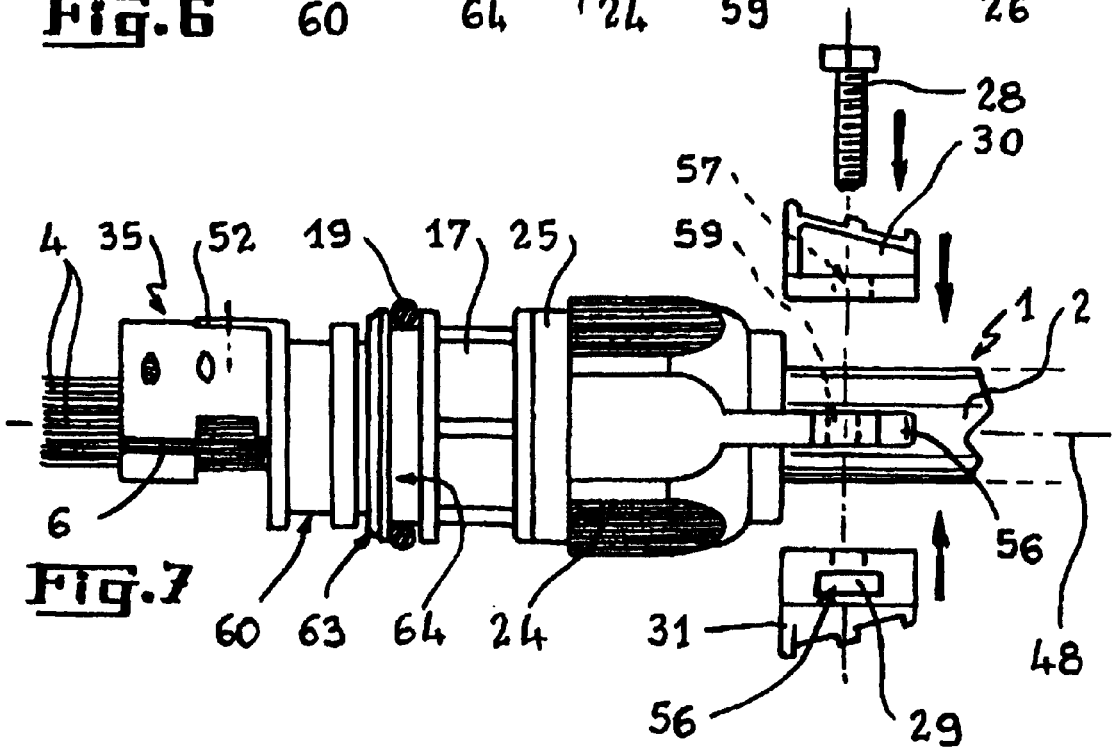

Then (FIGS. 7 and 8), by means of the retaining clamp in two halves 30, 31, of the two nuts 29, and of the two associated clamping screws 28, the cable 1 is retained on the two rear tabs 26, 27 specially designed for this purpose on the special nut 24 of the stuffing box.

For this purpose, the two square nuts 29 are inserted sideways into their respective nut-receiving cavities 56 in the bottom half of the retaining clamp 31, the two halves of the retaining clamp 30, 31 are put in place so that their orifices 57, 58 through which respective ones of the two screws pass 28 coincide with the orifices 59 through which the screws also pass, and which are provided in respective ones of the rear tabs 26, 27 on the stuffing-box nut 24. The two clamping screws 28 are then tightened until the nut 24, the retaining clamp 30, 31, and the cable 1, via its outer sheath 2, are clamped together strongly.

It should be noted that the retaining clamp 30, 31 is made of a very rigid plastics material, e.g. a polyamide filled with glass fibers.

For example, the body 17 and its associated nut 24 may be made of optionally-filled polyamide, imparting slight flexibility to them, which is essential to stuffing box operation.

Figure 8:
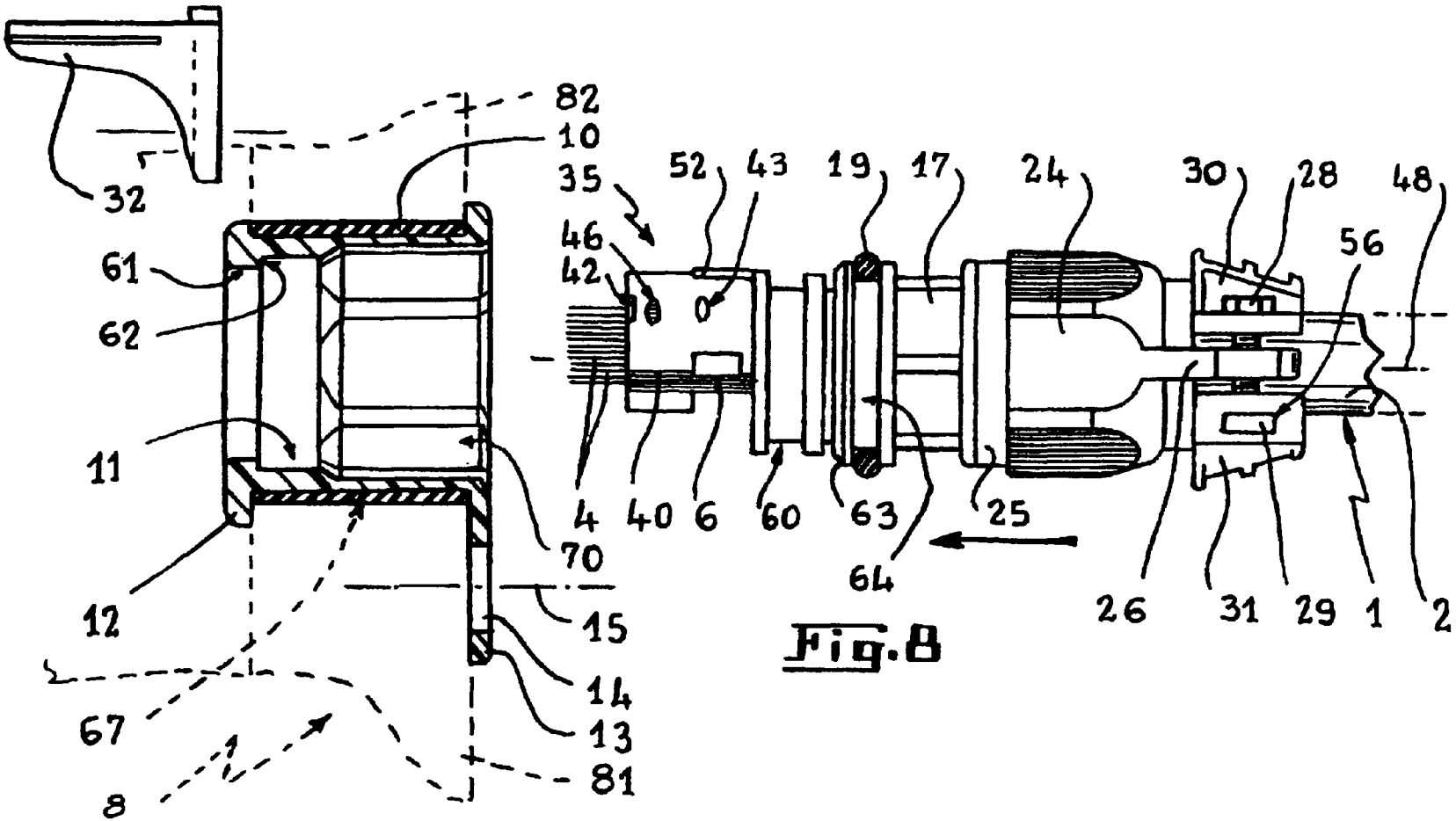

As shown in FIG. 8, the resulting assembly is then fully prepared, secured, and sealed, all this having been advantageously performed outside the splice box 8.

As shown in FIGS. 8 and 9, the following step consists in inserting the assembly into the box 8 via its inlet passageway 11 provided for this purpose, until it comes into abutment in a position (FIG. 9) in which only the head 35 of the metal solepiece 16 and a front groove 60 in the body 17 project beyond the inlet passageway 11 into the box 8, the inlet sealing in the passageway 11 being provided by the above mentioned O-ring sealing gasket 19.

For this purpose, the inlet passageway 11 has a special shape, corresponding to the shape given to the body 17, this special shape being imparted to it in this embodiment, and therefore in a manner that is in no way limiting, by the shape of the above-mentioned adapter piece 12.

As can be seen in the drawings (in particular in FIG. 8), at its front end, the inlet passageway 11, i.e. the inside wall of the adapter piece 12 in this example, is provided with a reduced outlet section portion 61 which, while enabling the head 35 and the groove 60 to pass through it easily, defines a circular shoulder 62 which, in cooperation with a corresponding annular shoulder 63 on the body 17, positioned slightly upstream from the groove 60 as shown in the drawings, serves as an end-of-stroke abutment on inserting the assembly into the orifice 11.

The O-ring gasket 19 is positioned in an annular groove 64 in the body 17, which groove is, in this example, situated just in front of the abutment shoulder 63, and when the body is in the abutment position as shown in FIG. 9, the gasket 19 is pressed between said groove 64 and the inside wall of the passageway 11, and thus of the adapter piece 12, whose section is matched accordingly at this place.

Very advantageously, the rear half 70 of the inlet passageway 11, i.e. the rear inside surface of the adapter piece 12, is hexagonal in shape, i.e. it has the female shape corresponding to the hexagonal outside surface of the stuffing box nut 24. In the abutment position shown in FIG. 12, the nut 24 is inserted at least in part into the hexagonal inlet 70 of the passageway 11, thereby preventing it from rotating, so that the cable inlet device is then effective in withstanding any external torsion stresses that are exerted subsequently on the cable 1.

All that then remains to be done, as shown in FIGS. 9,9A, and 10, is to put the above-mentioned locking fork or key 32 in place by clipping it into the groove 60. The cable inlet is then fully put in place, clamped, locked, and sealed, without it being necessary, as it is in the prior art, to act inside the box, e.g. to perform often difficult tightening operations, and without sealing on the outer sheath of the cable being performed upstream from the point at which it is secured, with the resulting weakening of the sealing.

The device is particularly simple and user-friendly to fit and to put in place, thereby greatly facilitating the task of the user, and, in addition, the amount of longitudinal space that it takes up inside the chamber or container is reduced significantly.

Figure 11:
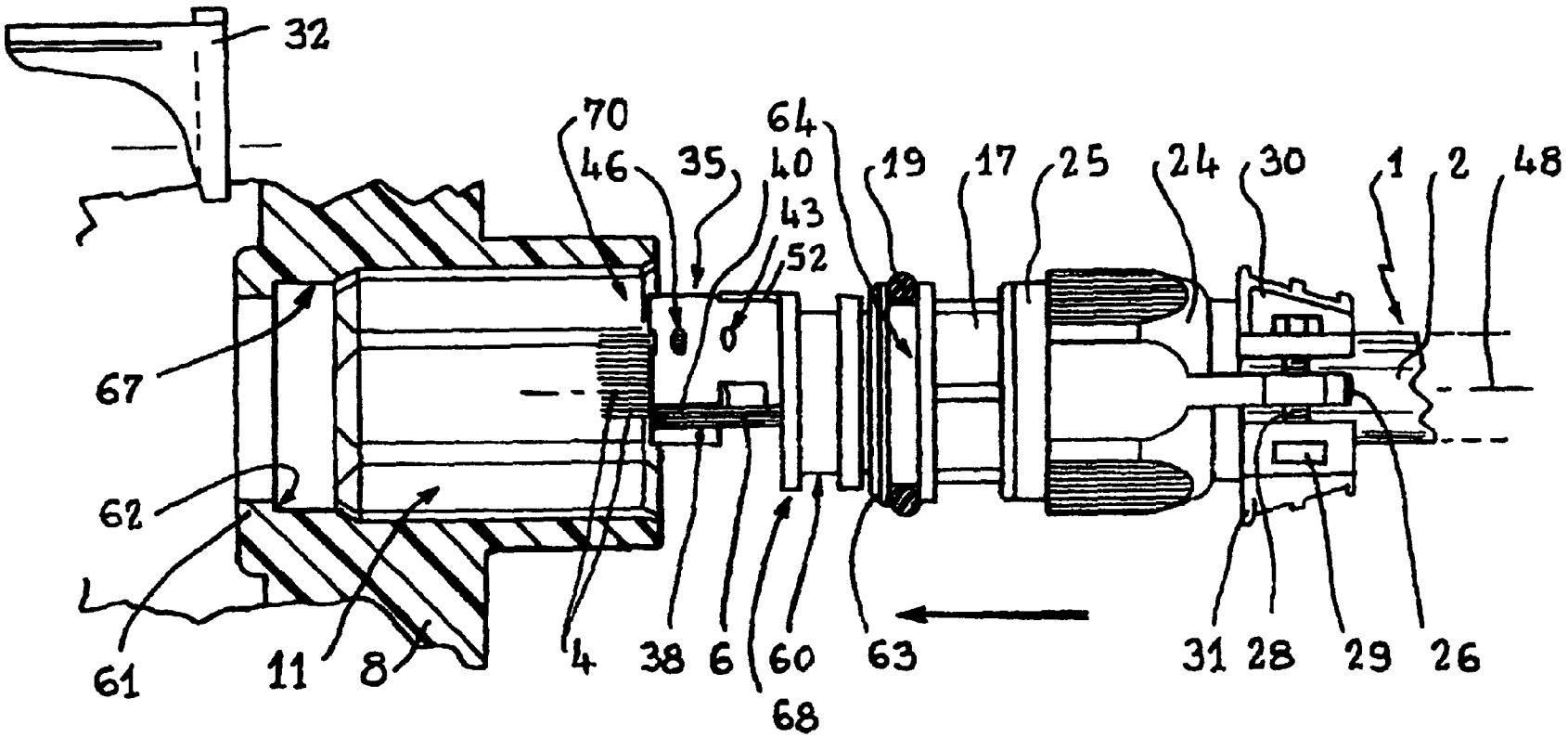
FIG. 11 is a view similar to FIG. 8, and showing a variant embodiment.

Naturally, the invention is not limited to the above-described embodiment. For example, the adapter piece 12 could be omitted or simply replaced with a corresponding shape on the inside surface of the inlet passageway 11, which is then made in one-piece with, typically by being integrally molded with, the box 8, as shown diagrammatically in FIG. 11.

What is claimed is:

1. A watertight inlet device for inserting a cable containing optical fibers into a chamber or into a container via an inlet passageway provided for this purpose:

said device being fitted to the cable and secured to the strength members thereof before the cable is inserted into the chamber or container, the outer sheath of the cable further being secured directly on the watertight inlet device, the watertight inlet device then being received by being threaded into the chamber or container, and being locked therein by keying, *said device comprising: at the front: a rigid securing solepiece provided with orifices or slots into which central strength members and/or side strength members of the cable are inserted, each of these orifices or slots co-operating with a clamping member acting by a screw being rotated to clamp the strength member(s) that it receives; at the rear: a nut for-clamping a stuffing box, which nut receives a retaining member for retaining the outer sheath of the optical cable; and between the front and the rear: a sealing tubular body whose front portion engages telescopically into said securing solepiece, means for fixing the sealing body to the securing solepiece when said front portion is engaged telescopically into said securing solepiece, the rear portion of the tubular body and sealing ring form the sealing stuffing box, the stuffing box achieving the sealing by clamping on the outer sheath of the cable; the sealing body also receiving means for providing the sealing relative to the inlet passageway in the chamber or container, and further including an abutment member which is designed to limit the insertion of the device through said inlet passageway, the abutment position then being such that the head of the device emerges inside the chamber or container, keying means for locking the device in this position.*

[2. A device according to claim 1, said device comprising:

at the front: a rigid securing solepiece provided with orifices or slots into which central strength members and/or side strength members of the cable are inserted, each of these orifices or slots co-operating with a clamping member acting by a screw being rotated to clamp the strength member(s) that it receives;

at the rear: a nut for-clamping a stuffing box, which nut receives a retaining member for retaining the outer sheath of the optical cable; and between the front and the rear: a sealing tubular body whose front portion engages telescopically into said securing solepiece, means for fixing the sealing body to the securing solepiece when said front portion is engaged telescopically into said securing solepiece, the rear portion of the tubular body and sealing ring form the sealing stuffing box, the stuffing box achieving the sealing by clamping on the outer sheath of the cable; the sealing body also receiving means for providing the sealing relative to the inlet passageway in the chamber or container, and further including an abutment member which is designed to limit the insertion of the device through said inlet passageway, the abutment position then being such that the head of the device emerges inside the chamber or container, keying means for locking the device in this position.]

3. An optical cable inlet device according to claim [2] *1*, wherein said clamping nut has an outside shape comprising a plurality of facets, while the rear portion of said passageway orifice is of the corresponding female shape.

4. A device according to claim 1, wherein [said keying means are] *the keying is* constituted by a semi-rigid retaining fork which plugs into an outer annular groove in the cable inlet device, thereby holding it captive in part, the groove therefore emerging downstream relative to said inlet passageway when the device is inserted to its abutment position.

5. A cable inlet device according to claim [2] *1*, wherein said nut for clamping a stuffing box is provided with two rear tabs which are designed to receive a retaining member for retaining the outer sheath of the optical cable.

6. A device according to claim 5, wherein the retaining member is in the form of a clamp in two halves.

7. A device according to claim [2] *1*, wherein said sealing body receives a rigid compensation ring which is matches, as a function of the diameter of the optical cable to limit the clamping of said nut for clamping a stuffing box to its correct value.

8. An optical cable inlet device according to claim 1, wherein said inlet passageway is implemented by a means of an intermediate piece for adapting to the inlet orifice of the chamber or container.

9. An optical cable inlet device according to claim 1, wherein said inlet passageway is made in one piece with the chamber or container.

*10. A watertight inlet device for inserting an optical fiber cable into a container via an inlet passageway, wherein the device is fitted to the optical fiber cable and secured to one or more strength members of the optical fiber cable with a solepiece, wherein an outer sheath of the cable is secured directly on the watertight inlet device, wherein the watertight inlet device includes a sealing body comprises a groove formed in an outer surface to retain an O-ring gasket, the O-ring gasket interacting with the inlet passageway to provide a watertight seal and wherein the watertight inlet device is then received by being inserted into the container, and is locked therein by keying, wherein the inlet passageway includes a first structure and the watertight inlet device includes a second structure that cooperatively interact to prevent rotational displacement of the watertight inlet device inserted in the inlet passageway.*

*11. The watertight inlet device of claim 10, wherein a front portion of the device includes the solepiece having at least one of orifices, notches and slots to receive the one or more strength members of the optical fiber cable and having a clamping member to clamp the one or more strength members in the at least one of orifices, notches and slots.*

*12. The watertight inlet device of claim 10, wherein the sealing body is affixable to the solepiece, wherein the sealing body fits to the optical fiber cable in a watertight manner.*

*13. The watertight inlet device of claim 12, wherein the sealing body is tubular and comprises abutment fingers to receive and secure a sealing gasket about an outer diameter of the fiber optic cable.*

*14. The watertight inlet device of claim 13, further comprising a clamping nut configured to cooperate with an outer surface of the sealing body to clamp the abutment fingers.*

*15. The watertight inlet device of claim 14, wherein the clamping nut includes a clamping mechanism to retain the outer sheath the optical fiber cable.*

*16. The watertight inlet device of claim 12, wherein the sealing body comprises an abutment body to limit an insertion of the watertight inlet device in the inlet passageway.*

*17. The watertight inlet device of claim 12, wherein the sealing body comprises a channel disposed on an outer surface thereof.*

*18. The watertight inlet device of claim 17, wherein the channel is configured to receive a locking fork.*

*19. The watertight inlet device of claim 10, wherein the first structure includes at least one first flat surface and the second structure includes at least one second flat surface, wherein the first and second flat surfaces cooperatively interact to prevent rotational displacement of the watertight inlet device inserted in the inlet passageway.*

*20. The watertight inlet device of claim 19, wherein the first structure and the second structure are hexagonally shaped.*

*21. A watertight inlet device for inserting an optical fiber cable in a container, comprising:*

*a solepiece and a sealing body, wherein the sealing body fits to the optical fiber cable in a watertight manner, wherein the solepiece is coupled to the sealing body and is secured to one or more strength members of the optical fiber cable, and wherein the device is receivable by an inlet port disposed in a container and is secured therein by a locking mechanism, wherein the sealing body comprises a groove formed in an outer surface to retain an O-ring gasket, said O-ring gasket interacting with the inlet port to provide a watertight seal.*

*22. The watertight inlet device of claim 21, wherein the inlet port includes a first structure and the watertight inlet device includes a second structure that cooperatively interact to prevent rotational displacement of the watertight inlet device inserted in the inlet port.*

*23. The watertight inlet device of claim 21, wherein the sealing body comprises a stuffing box that includes a set of abutment fingers to receive a sealing gasket configured to surround the optical fiber cable.*

*24. The watertight inlet device of claim 23, wherein the stuffing box includes a threaded outer surface receivable by a clamping nut.*

*25. The watertight inlet device of claim 21, wherein the locking mechanism comprises a fork structure receivable in a channel formed on an outer surface of the sealing body.*

*26. The watertight inlet device of claim 21, wherein the solepiece includes a member at least partially insertable within the sealing body.*

*27. The watertight inlet device of claim 21, wherein the sealing body is tubular and comprises abutment fingers to receive and secure a sealing gasket about an outer diameter of the fiber optic cable.*

*28. A watertight inlet device for inserting an optical fiber cable in a container, comprising:*

*a solepiece and a sealing body, wherein the sealing body fits to the optical fiber cable in a watertight manner, wherein the solepiece is coupled to the sealing body and is secured to one or more strength members of the optical fiber cable, and wherein the device is receivable by an inlet port disposed in a container and is secured therein by a locking mechanism, wherein the sealing body comprises a stuffing box that includes a set of abutment fingers to receive a sealing gasket configured to surround the optical fiber cable.*

*29. The watertight inlet device of claim 28, wherein the stuffing box includes a threaded outer surface receivable by a clamping nut.*

*30. The watertight inlet device of claim 28, wherein the locking mechanism comprises a fork structure receivable in a channel formed on an outer surface of the sealing body.*

*31. The watertight inlet device of claim 28, wherein the solepiece has at least one of orifices, notches and slots to receive the one or more strength members of the optical fiber cable and has a clamping member to clamp the one or more strength members in the at least one of orifices, notches and slots.*

*32. The watertight inlet device of claim 28, wherein the sealing body is tubular.*

*33. The watertight inlet device of claim 28, wherein the sealing body comprises a groove formed in an outer surface to retain an O-ring gasket, said O-ring gasket interacting with the inlet port to provide a watertight seal.*

*34. A watertight inlet device for inserting an optical fiber cable into a container via an inlet passageway, wherein the device includes a solepiece fitted to the optical fiber cable and secured to one or more strength members of the optical fiber cable, wherein an outer sheath of the cable is secured directly on the watertight inlet device to a sealing body, and wherein the watertight inlet device is insertable in the inlet passageway, and is locked therein, wherein the inlet passageway includes a first structure having at least one first flat surface and the watertight inlet device includes a second structure having at least one second flat surface, wherein the first and second flat surfaces cooperatively interact to prevent rotational displacement of the watertight inlet device inserted in the inlet passageway.*

*35. The watertight inlet device of claim 34, wherein the sealing body comprises a groove formed in an outer surface to retain an O-ring gasket, the O-ring gasket interacting with the inlet port to provide a watertight seal.*

*36. The watertight inlet device of claim 34, wherein a front portion of the device includes the solepiece, the solepiece including at least one of orifices, notches and slots to receive the one or more strength members of the optical fiber cable.*

*37. The watertight inlet device of claim 36, wherein the solepiece includes a clamping member to clamp the one or more strength members in the at least one of orifices, notches and slots.*

*38. The watertight inlet device of claim 34, wherein the solepiece includes a member at least partially insertable within the sealing body.*

*39. The watertight inlet device of claim 34, wherein the sealing body is tubular and comprises abutment fingers to receive and secure a sealing gasket about an outer diameter of the fiber optic cable.*

*40. The watertight inlet device of claim 34, wherein the first structure is part of an adapter piece mountable within an orifice of the container.*

* * * * *